UNITED STATES PATENT OFFICE.

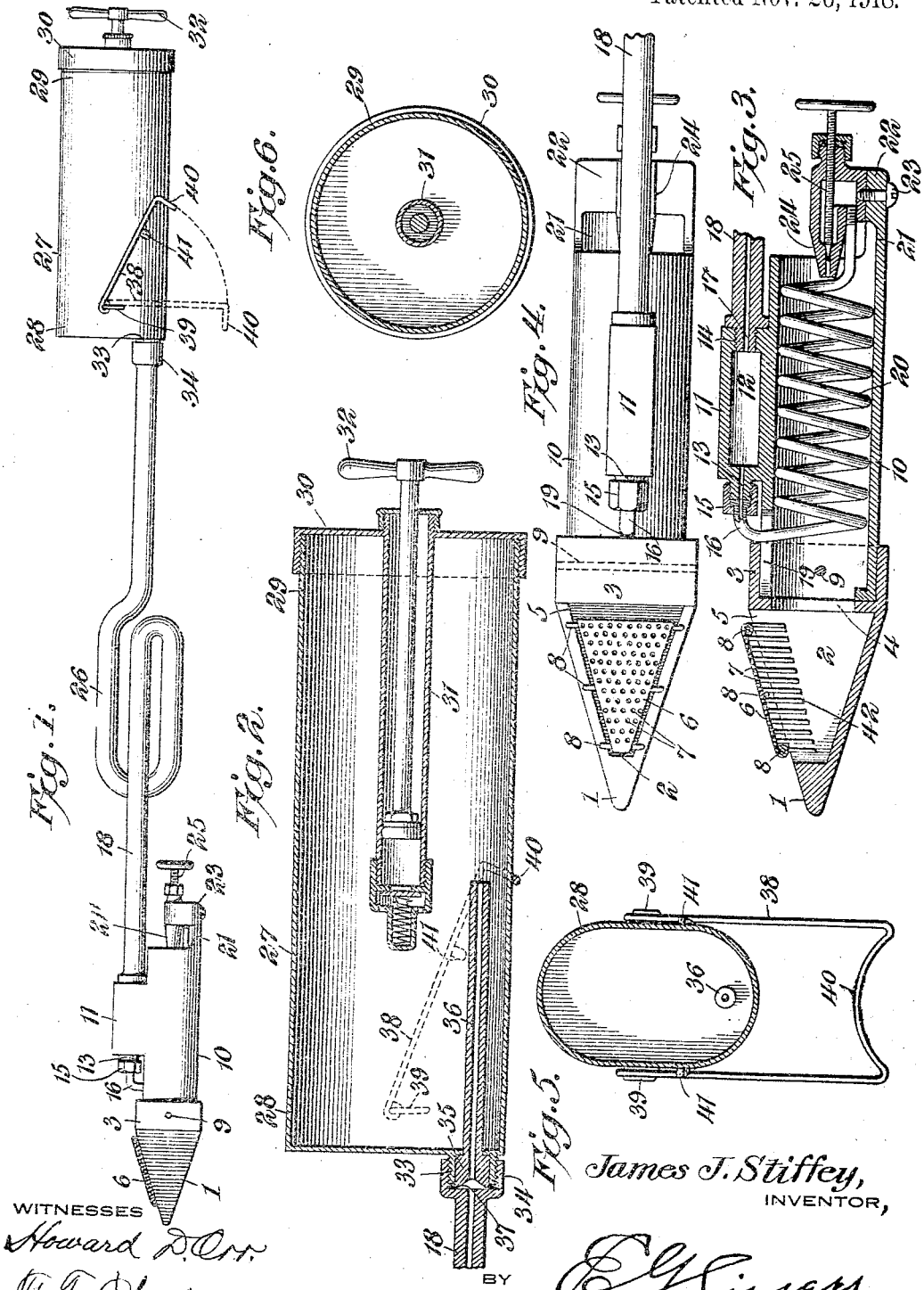

JAMES J. STIFFEY, OF CONEMAUGH, PENNSYLVANIA, ASSIGNOR OF ONE-THIRD TO MATT MAROHNICH AND ONE-THIRD TO LOUIS PROSTREDNY, BOTH OF JOHNSTOWN, PENNSYLVANIA.

SOLDERING-IRON 1,285,830.

Specification of Letters Patent.   Patented Nov. 26, 1918.

Application filed December 29, 1917.   Serial No. 209,502.

*To all whom it may concern:*

Be it known that I, JAMES J. STIFFEY, a citizen of the United States, residing at Conemaugh, in the county of Cambria and State of Pennsylvania, have invented a new and useful Soldering-Iron of which the following is a specification.

This invention has reference to soldering irons, and its object is to provide a soldering iron in which means for heating the iron form part thereof.

The invention comprises a soldering head which may be of copper as is customary, such head being hollow and open at one side where it is provided with a perforated or reticulated cover so arranged as to permit the escape of gases of combustion. The heat is carried by a hollow body member having a tortuous duct for fuel, and a needle valve for controlling the flow of fuel. The body member and head are carried by the pipe leading to a fuel reservoir constituting the handle of the soldering iron, so that it is unnecessary to provide a stove or similar means for heating the iron, and the latter may be kept at an even temperature, while the soldering operation is proceeding.

The invention will be best understood from a consideration of the following detailed description, taken in connection with the accompanying drawings forming part of this specification, with the further understanding that, while the drawing shows a practical form of the invention, the latter is not confined to any strict conformity with the showing of the drawing but may be changed and modified so long as such changes and modifications come within the scope of the appended claims.

In the drawing:—

Figure 1 is a side elevation of a soldering iron constructed in accordance with the invention;

Fig. 2 is a longitudinal central section of the reservoir end of the soldering iron;

Fig. 3 is a longitudinal section with some parts in elevation of the head end of the soldering iron;

Fig. 4 is a plan view of the structure shown in Fig. 3.

Fig. 5 is a cross section of the reservoir end, omitting the pump;

Fig. 6 is a cross section of the reservoir end, with the section traversing the pump, and looking in the direction opposite to that of the view of Fig. 5.

Referring to the drawings, there is shown a soldering iron head 1 which may be of the usual pyramidal form, and may also be made of copper, after the customary practice. Within the head 1 there is formed a chamber 2 leaving the walls of the head relatively thin, since, as will hereinafter appear, heat is localized immediately back of the soldering end of the head, and is there maintained, thus doing away with the necessity of providing a relatively large mass of metal at the head to store sufficient heat for the soldering operation. That end of the head 1 remote from the soldering point is formed into a socket 3 communicating with the chamber 2 through a passage 4 of relatively large area. The chamber 2 is open along one side, as shown at 5, throughout substantially the full length and width of the chamber, and the opening is covered by a plate 6 which may be perforated or reticulated as shown at 7 and is supported by a series of wires or bars 8 driven or otherwise connected at the ends to the body of the head 1. The cover 6 protects the chamber 2 from direct access, but permits the ready escape of the products of combustion, distributing such products of combustion throughout the chamber, and preventing localized escape thereof. This results in a thorough heating of the head 6 throughout practically the whole mass of the head and particularly toward the point where the head is most efficiently utilized.

Fitted into the socket 3 and held there by a pin 9 or otherwise, is a body member 10 of elongated form and hollow throughout its length. The body member is closed in most part except at the ends, and along one side is formed with an offset boss 11 in which there is a chamber 12. At one end the boss 11 is formed with a screw nipple 13 and at the other end with a screw socket 14. The nipple 13 has a gland or thimble nut 15 applied thereto, holding one end of a pipe 16 to the nipple. At the other end of the boss 11, the socket 14 receives a nipple 17 on one end of a pipe 18, to which latter reference will hereinafter be made.

The pipe 16 is carried through a suitable opening 19 in the corresponding portion of the body member 10, and is formed into a coil 20 within and extending lengthwise of the body member 10. At the end remote from the head 1, the body member is formed with a prolongation or lip 21 terminating in a thickened portion 22 so that the part of the body portion 10 provided with the lip 21 may be utilized as a priming pan for preliminarily heating the coil 20 with a suitable burning agent poured into the body 10 at the end thereof containing the projecting lip 21.

Supported on and secured to the thickened part 22 by a screw 23 is a nozzle 24 containing a controlling needle valve 25, which may be of customary construction, and receives that end of the coil 20 remote from its connection with the nipple 13. The nozzle 24 is arranged axially of the coil and is directed toward the passage 4 through which the interior of the body 10 communicates with the chamber 2.

The pipe 18 is of sufficient diameter and length to constitute the shank portion of the soldering iron, and at an intermediate point is formed into a loop 26 extending substantially lengthwise of the shank, and may, as shown, consist of a single turn located about midway of the shank between the reservoir 27 and the soldering iron head.

At the end of the shank 18 remote from the body portion 10, it has attached to it a reservoir 27 which, at the front end, may be of oval cross section as indicated at 28 in Fig. 5, while at the rear end, it is of round cross section as indicated at 29 in Fig. 6. The oval cross section is convenient for grasping by the hand, while the round cross section is utilized for the application of a cap 30 which is screwed onto the reservoir 27, so that it constitutes a filling cap for the reservoir.

The cap 30 carries a pump 31 with a manipulating handle 32 exterior to the cap, while the pump 31 is lodged within the reservoir 27. The pump 31 requires no special description, since it may follow the lines of the usual air pumps employed in torches for producing air pressure to drive liquid fuel to the burner.

The reservoir 27 has a nipple 33 at the end remote from the cap 30, and close to one side of the reservoir and the pipe or shank 18, has a socket end 34 screwed onto the nipple. Within the nipple 33, which is hollow, there is lodged a head 35 formed on one end of a pipe 36 of sufficient length to enter the reservoir 27 and extend an appropriate distance toward the other end thereof, the head 35 having the end remote from the pipe 36 formed with a relatively sharp edge 37 to produce a fluid-tight joint where engaged by the socket 34.

The shank 18 extends in the direction of the length of the body member 10, but to one side of the longitudinal axis thereof, so that when the soldering iron head 1 rests upon a supporting surface, the shank 18 extends lengthwise of the surface but elevated above it, while the reservoir 27 also extends lengthwise of the same surface and still farther elevated above it. To support the soldering iron upon an appropriate surface, a yoke 38 is pivotally connected at the ends to eyes 39 on opposite sides of the reservoir 28 preferably near its connection with the pipe or shank 18. This yoke has a curved foot 40 serving as a rest when the yoke is in the reservoir-supporting position and embracing the reservoir when the yoke is moved into contact therewith. In order to hold the yoke close to the reservoir when not in use, lugs 41 are provided on opposite sides of the reservoir in the path of the legs of the yoke so that the yoke may snap over these lugs and be held in the inactive position.

Considering the reservoir 27 as containing a supply of fuel and the needle valve 25 as closed, air pressure is established within the reservoir by the pump 31 in the usual manner, and suitable priming liquid is placed in the body portion 10 and ignited. When the coil 20 has become sufficiently heated, the needle valve 25 is opened, permitting liquid from the reservoir 28 to flow through the pipe 18, and this liquid is gasified when it reaches the coil 20, flowing through the nozzle 24 in the form of gas, and becomes ignited when it is passing through the coil, maintaining the latter heated, and enters the chamber 2 and escapes through the opening 5 thereof in the form of an intensely hot flame well distributed through the chamber 2 and against the point portion of the head 1, the result being that the soldering iron head becomes sufficiently heated, and by adjusting the valve 25, the heat may be maintained at a desired temperature.

The pipe 36 permits the maintaining of a flow of fuel to the burner when the soldering iron is held in an upright position, that is, with the soldering head uppermost, and the pipe 36 may be as long as needful for the purpose.

The coil 26 localizes a small supply of fuel to prevent the stoppage of the flame under some circumstances, and the chamber 12 also localizes fuel for the same purpose. The soldering iron may be carried in a workman's kit, and requires no plumber's furnace or other separate heating means. The reservoir conveniently fits the hand, and no filling plug and separate fitting for the pump are required. The soldering iron may be placed upon a support with the reservoir high, while the soldering iron is approximately level, because of the presence of the yoke 38, the latter being capable of movement out of the way when the soldering iron is in use.

The soldering iron head may be made light, using but little material, because the head is brought very close to the working point of the iron. Furthermore, the small amount of material necessary in the head, beside reducing the cost of manufacture, prevents conduction of heat to the shank, so that while the soldering iron is in use, the shank, even at a relatively short distance from the head, is quite cool.

In order to give free escape of the gases of combustion from the chamber 2 and still thoroughly distribute these gases within the chamber, the plate 6 is provided with a fringe about its edge portions, such fringe being indicated at 42 and may be formed integral with the plate.

What is claimed is:—

1. A soldering iron provided with a head, a shank to one side of the longitudinal axis of the head and constituting a fuel duct, and a reservoir for fuel constituting the handle of the soldering iron and arranged still farther to one side of the longitudinal axis of the head, said reservoir being provided with a supporting member movable into and out of contact with said reservoir and arranged on the side thereof toward the longitudinal axis of the head.

2. A soldering iron provided with a head, a shank to one side of the longitudinal axis of the head, a handle at the end of the shank remote from the head and arranged still farther to one side of the longitudinal axis of the head, the handle being provided with a supporting member movable into and out of contact with it and located on the side of said handle toward the longitudinal axis of the head.

3. A soldering iron provided with a head, a shank to one side of the longitudinal axis of the head, a handle at the end of the shank remote from the head and arranged still farther to one side of the longitudinal axis of the head, the handle being provided with a supporting member movable into and out of contact with it and located on the side of said handle toward the longitudinal axis of the head, said supporting member being in the form of a yoke with the legs of the yoke straddling the handle and pivoted thereto, and with the intermediate portion of the yoke movable away from the handle to constitute a supporting foot to hold the soldering iron substantially level on a supporting surface when the head is also resting on such supporting surface.

4. A soldering iron provided with a head, a shank to one side of the longitudinal axis of the head and constituting a fuel duct, a reservoir for fuel constituting the handle of the soldering iron and arranged still farther to one side of the longitudinal axis of the head, said reservoir being of rounded cross section, and a yoke-shaped supporting member straddling the reservoir and having the intermediate portion rounded in conformity with the rounded form of the reservoir, and the extremities of its legs remote from the intermediate portion pivotally connected to the reservoir, and said reservoir being provided with means for temporarily holding the support in inactive close approach to the reservoir.

5. A soldering iron comprising a head portion, a body portion to which the head is attached, a tubular shank carrying the body portion, and a handle in the form of a reservoir for fuel, the shank being formed with a single loop extended lengthwise of said shank between the body portion and the fuel reservoir, and the body portion carrying the head being provided with a heating coil and nozzle.

6. A soldering iron comprising a head portion, a body portion to which the head is attached, a tubular shank carrying the body portion, and a handle in the form of a reservoir for fuel, the shank being formed with a loop, and the body portion carrying the head being provided with a heating coil and nozzle, said body portion also having a chamber for fuel between the tubular shank and the heating coil.

7. A soldering iron comprising a head portion, a body portion, a burner carried by the body portion for heating the head, a tubular shank communicating with the burner, and a reservoir constituting the handle of the soldering iron and having a removable cap of a diameter corresponding to the diameter of the reservoir at its outer end, the reservoir at the cap end being round in cross section and toward the other end being of oval cross section to constitute a handle.

8. A soldering iron comprising a burner and a head portion located at one end thereof, a tubular shank communicating with the burner, and a reservoir at the other end of the soldering iron and communicating with the shank, said reservoir being of oval cross section to constitute a handle.

9. A soldering iron comprising a head portion, a burner adjacent to the head portion, a shank portion arranged to conduct fuel to the burner, and a handle portion constituting a reservoir for fuel, said reservoir being oval to provide a hand hold, and cylindrical at the outer end, and there having a cap of a size corresponding to the reservoir, said cap being provided with an air pump extending into the reservoir.

10. A soldering iron having at one end a soldering head and burner, a handle at the other end of the soldering iron constituting a reservoir for fuel, and a tubular shank forming a fuel duct between the reservoir and burner and constituting the sole connection and support for the burner and soldering head from the handle, said tubular shank including a loop located intermediately of the reservoir and burner and forming a localizing means for fuel.

11. A soldering iron provided with a head having a chamber therein open at one side, a reticulated cover for and constantly spaced at the edges from the open side of the chamber, and a burner associated with the soldering head to direct flame into the chamber.

12. A soldering iron provided with a head having a chamber therein open at one side, a reticulated cover for the open side of the chamber, and a burner associated with the soldering head to direct flame into the chamber, said cover having an openwork fringe about its edges entering the chamber.

13. A soldering iron having a head with a chamber therein extending toward the point of the head and open along one side, an openwork cover plate of less area than the open side, said plate having an openwork fringe about its edges entering the chamber, and heating means associated with the head for directing flame into the chamber.

14. A soldering iron provided with a head portion and a body portion carrying the head, a heating coil for fuel within the body portion, and a fuel directing jet member associated with the heating coil, the body portion having an extension beyond the end remote from the head, and said extension and body portion on the same side as the extension constituting a receptacle for priming fuel.

In testimony that I claim the foregoing as my own, I have hereto affixed my signature in the presence of two witnesses.

JAMES J. STIFFEY.

Witnesses:
 WILL J. LAMBERD,
 HELEN VON ALT.